(12) United States Patent
Boykin et al.

(10) Patent No.: US 7,020,284 B2
(45) Date of Patent: Mar. 28, 2006

(54) PERCEPTUAL ENCRYPTION AND DECRYPTION OF MOVIES

(76) Inventors: Patrick Oscar Boykin, 400 Perkins St., Apartment No. 310, Oakland, CA (US) 94610; Riccardo Boscolo, 9520 Lucerne Ave., Apartment No. 2, Culver City, CA (US) 90232-2932

( * ) Notice: Subject to any disclaimer, the term of this patent is extended or adjusted under 35 U.S.C. 154(b) by 742 days.

(21) Appl. No.: 09/891,147

(22) Filed: Jun. 25, 2001

(65) Prior Publication Data

US 2003/0063745 A1    Apr. 3, 2003

Related U.S. Application Data

(63) Continuation-in-part of application No. 09/740,717, filed on Dec. 19, 2000, and a continuation-in-part of application No. 09/684,724, filed on Oct. 6, 2000, now abandoned.

(51) Int. Cl.
*G06F 1/26* (2006.01)

(52) U.S. Cl. .................. 380/200; 380/239; 380/240
(58) Field of Classification Search ................ 380/200, 380/239, 240
See application file for complete search history.

(56) References Cited

U.S. PATENT DOCUMENTS

| 5,748,783 | A | * | 5/1998 | Rhoads | ........................ 382/232 |
| 5,841,978 | A | * | 11/1998 | Rhoads | ........................ 709/217 |
| 5,901,246 | A | * | 5/1999 | Hoffberg et al. | ............ 382/209 |

* cited by examiner

*Primary Examiner*—Thomas R. Peeso
(74) *Attorney, Agent, or Firm*—W. Edward Johansen

(57) ABSTRACT

The present invention is a combined encoder and perceptual encrypter for a file of high quality video. The combined encoder and perceptual encrypter includes an encoder and perceptual encrypter. The encoder encodes the file of high quality video as encoded data. The perceptual encryption module perceptually encrypts the encoded data in order to generate restricted video data as perceptually encrypted encoded data.

4 Claims, 8 Drawing Sheets

MPEG-1 program

8x8 image region

8x8 DCT
(zig-zag scan)

PERCEPTUAL ENCRYPTION AND DECRYPTION OF MOVIES

This is a continuation-in-part of an application filed Oct. 6, 2000 under Ser. No. 09/684,724, now abandoned, and is a continuation-in-part of an application filed Dec. 19, 2000 under Ser. No. 09/740,717.

BACKGROUND OF THE INVENTION

The invention relates to perceptual encryption of high quality compressed video sequences and more particularly to perceptual encryption of files of high quality video to generate files of restricted video as perceptually encrypted encoded data in an MPEG-1 format. The files of restricted video can either be decoded and played as restricted video or be decrypted, decoded and played as high quality video.

The MPEG standards determine the encoding and decoding conditions of motion pictures in the form of a flow of video digital data and a flow of audio digital data. The MPEG standards define the encoding conditions of motion pictures, whether associated or not with a sound signal, for storing in a memory and/or for transmitting using Hertzian waves. The MPEG standards also define the encoding conditions of the individual picture sequences that form the motion picture to be restored on a screen. Digital pictures are encoded in order to decrease the amount of corresponding data. Encoding generally uses compression techniques and motion estimation. The MPEG standards are used to store picture sequences on laser compact disks, interactive or not, or on magnetic tapes. The MPEG standards are also used to transmit pictures on telephone lines.

U.S. Pat. No. 6,205,180 teaches a device which demultiplexes data encoded according to the MPEG standard in the form of a data flow including system packets, video packets and audio packets. The device independently organizes according to the nature (system packets, video packets and audio packets) of the data included in the packets and the storing of the data in various registers.

The encoding and decoding conditions as defined by the MPEG standards can be obtained from standard organizations. The decoding of data encoded according to one of the MPEG standards uses a separation of the data included in the data flow according to its nature. The video data is separated from the audio data, if any, and the audio and video data are separately decoded in suitable audio and video decoders. The data flow also includes system data. The system data includes information relating to the encoding conditions of the data flow and is used to configure the video and audio decoder(s) so that they correctly decode the video and audio data. The separation of the various data included in the data flow is done according to their nature. The separation is called the system layer. The system, audio and video data are separated before the individual decoding of the audio and video data.

There are current technologies for protecting the copyright of digital media are based on a full encryption of the encoded sequence. Full encryption does not allow the user any access to the data unless a key is made available.

There are alternative approaches to ensure rights protection. These approaches are based on "watermarking" techniques which aim to uniquely identify the source of a particular digital object thanks to a specific signature hidden in the bit stream and invisible to the user.

The distribution of movies for viewing in the home is one of the largest industries in the world. The rental and sale of movies on videotape is a constantly growing industry amounting to over $15 billion dollars in software sales in the United States in 1995. The most popular medium for distributing movies to the home is by videotape, such as VHF. One reason for the robust market for movies on videotape is that there is an established base of videocassette recorders in people's homes. This helps fuel an industry of local videotape rental and sale outlets around the country and worldwide. The VHS videotape format is the most popular videotape format in the world and the longevity of this standard is assured due to the sheer numbers of VHS videocassette players installed worldwide. There are other mediums for distributing movies such as laser disk and 8 mm tape. In the near future, Digital Versatile Disk (DVD) technology will probably replace some of the currently used mediums since a higher quality of video and audio would be available through digital encoding on such a disk. Another medium for distributing movies to the home is through cable television networks. These networks currently provide pay-per-view capabilities and in the near future, direct video on-demand. For the consumer, the experience of renting or buying the videotape is often frustrating due to the unavailability of the desired titles. Movie rental and sales statistics show that close to 50% of all consumers visiting a video outlet store do not find the title that they desire and either end up renting or buying an alternate title or not purchasing anything at all. This is due to the limited space for stocking many movie titles within the physical confines of the store. With limited inventory, video stores supply either the most popular titles or a small number of select titles. Increasing the inventory of movie titles is in direct proportion to the shelf capacity of any one video-store. Direct video distribution to the home is also limited by the availability of select and limited titles at predefined times. Pay-per-view services typically play a limited fare of titles at predefined times offering the consumer a very short list of options for movie viewing in the home. Video on-demand to the home is limited by the cable television head end facilities in its capacity to store a limited number of titles locally. All of the aforementioned mechanisms for distributing movies to the consumer suffer from inventory limitations. An untapped demand in movie distribution results if the inventory to the consumer can be made large enough and efficient enough to produce movies-on-demand in the format which the consumer desires. There is a need for the ability to deliver movies on-demand with a virtually unlimited library of movies on any number of mediums such as VHS videotape, 8 mm videotape, recordable laser disk or DVD. Some systems have addressed the need for distribution of digital information for local manufacturing, sale and distribution.

U.S. Pat. No. 5,909,638 teaches system which captures, stores and retrieves movies recorded in a video format and stored in a compressed digital format at a central distribution site. Remote distribution locations are connected through fiber optic connections to the central distribution site. The remote sites maybe of one of two types: a video retail store or a cable television (CATV) head end. In the case of a video retail store VHS videotapes or any other format videotapes or other video media may be manufactured on-demand in as little as three to five minutes for rental or sell-through. In a totally automated manufacturing system the customers can preview and order movies for rental and sale from video kiosks. The selected movie is either retrieved from local cache storage or downloaded from the central distribution site for manufacturing onto either a blank video-tape or a reused videotape. One feature of the system is the ability to write a two-hour videotape into a Standard Play (SP) format using a high-speed recording device. A parallel compression algorithm which is based on the MPEG-2 format is used to compress a full-length movie into a movie data file of approximately four gigabytes of storage. The movie data file can be downloaded from the central site to the remote manufacturing site and written onto a standard VHS tape using a parallel decompression engine to write the entire movie at high speeds onto a standard VHS videotape in approximately three minutes.

U.S. Pat. No. 5,793,980 teaches an audio-on-demand communication system which provides real-time playback of audio data transferred via telephone lines or other communication links. One or more audio servers include memory banks which store compressed audio data. At the request of a user at a subscriber PC, an audio server transmits the compressed audio data over the communication link to the subscriber PC. The subscriber PC receives and decompresses the transmitted audio data in less than real-time using only the processing power of the CPU within the subscriber PC. High quality audio data compressed according to loss-less compression techniques is transmitted together with normal quality audio data. Meta-data, or extra data, such as text, captions, still images, etc., is transmitted with audio data and is simultaneously displayed with corresponding audio data. The audio-on-demand system also has a table of contents which indicates significant divisions in the audio clip to be played and allows the user immediate access to audio data at the listed divisions. Servers and subscriber PCs are dynamically allocated based upon geographic location to provide the highest possible quality in the communication link.

U.S. Pat. No. 5,949,411 teaches a system which previews movies, videos and music. The system has a host data processing network connected via modem with one or more media companies and with one or more remote kiosks to transmit data between the media companies and the kiosks. A user at a remote kiosk can access the data. A touch screen and user-friendly graphics encourage use of the system. Video-images, graphics and other data received from the media companies are suitably digitized, compressed and otherwise formatted by the host for use at the kiosk. This enables movies, videos and music to be previewed at strategically located kiosks. The data can be updated or changed, as desired, from the host.

U.S. Pat. No. 6,038,316 teaches an encryption module and a decryption module for enabling the encryption and decryption of digital information. The encryption module includes logic for encrypting with a key the digital information and distributing the digital information. The decryption module includes logic for the user to receive the key. The decryption logic then uses the key to make the content available to the user.

U.S. Pat. No. 6,097,843 teaches a compression encoder which encodes an inputted image signal in accordance with the MPEG standard. The compression and decompression different is from a main compression encoding which is executed by a motion detection/compensation processing circuit, a discrete cosine transforming/quantizing circuit, and a Huffman encoding circuit. The compression and decompression are executed by a signal compressing circuit and a signal decompressing circuit. By reducing an amount of information that is written into a memory provided in association with the compression encoding apparatus, a necessary capacity of the memory can be decreased.

U.S. Pat. No. 6,064,748 teaches an apparatus for embedding and retrieving an additional data bit-stream in an embedded data stream, such as MPEG. The embedded data is processed and a selected parameter in the header portion of the encoded data stream is varied according to the embedded information bit pattern. Optimization of the encoded data stream is not significantly affected. The embedded information is robust in that the encoded data stream would need to be decoded and re-encoded in order to change a bit of the embedded information. As relevant portions of the header are not scrambled to facilitate searching and navigation through the encoded data stream, the embedded data can generally be retrieved even when the encoded data stream is scrambled.

U.S. Pat. No. 6,115,689 teaches an encoder and a decoder. The encoder includes a multi-resolution transform processor, such as a modulated lapped transform (MLT) transform processor, a weighting processor, a uniform quantizer, a masking threshold spectrum processor, an entropy encoder and a communication device, such as a multiplexor (MUX) for multiplexing (combining) signals received from the above components for transmission over a single medium. The decoder includes inverse components of the encoder, such as an inverse multi-resolution transform processor, an inverse weighting processor, an inverse uniform quantizer, an inverse masking threshold spectrum processor, an inverse entropy encoder, and an inverse MUX.

U.S. Pat. No. 5,742,599 teaches a method which supports constant bit rate encoded MPEG-2 transport over local Asynchronous Transfer Mode (ATM) networks. The method encapsulates constant bit rate encoded MPEG-2 transport packets, which are 188 bytes is size, in an ATM AAL-5 Protocol Data Unit (PDU), which is 65,535 bytes in size. The method and system includes inserting a plurality of MPEG-2 transport packets into a single AAL-5 PDU, inserting a segment trailer into the ATM packet after every two MPEG packets, and then inserting an ATM trailer at the end of the ATM packet. MPEG-2 transport packets are packed into one AAL-5 PDU to yield a throughput 70.36 and 78.98 Mbits/sec, respectively, thereby supporting fast forward and backward playing of MPEG-2 movies via ATM networks.

U.S. Pat. No. 6,157,625 teaches in an MPEG transport stream, each audio signal packet is placed after the corresponding video signal packet when audio and video transport streams are multiplexed.

U.S. Pat. No. 6,157,674 teaches an encoder which compresses and encodes audio and/or video data by the MPEG-2 system, multiplexing the same and transmitting the resultant data via a digital line. When generating a transport stream for transmitting a PES packet of the MPEG-2 system, the amounts of the compressed video data and the compressed audio data are defined as whole multiples of the amount of the transport packet (188 bytes) of the MPEG-2 system, thereby to bring the boundary of the frame cycle of the audio and/or video data and the boundary of the transport packet into coincidence.

U.S. Pat. No. 6,092,107 teaches a system which allows for playing/browsing coded audiovisual objects, such as the parametric system of MPEG-4.

The inventors incorporate the teachings of the above-cited patents into this specification.

SUMMARY OF THE INVENTION

The present invention is generally directed to an encoder and decoder. The encoder encodes a file of a high quality video data in order to generate a file of video data as encoded data. The decoder decodes the file of video data as encoded data in order to regenerate the file of high quality video data.

In a first separate aspect of the present invention, a perceptual encryption module perceptually encrypts the encoded data to generate restricted video data as perceptually encrypted encoded data.

In a second separate aspect of the present invention, a decryption module decrypts the perceptually encrypted encoded data to generate encoded data.

Other aspects and many of the attendant advantages will be more readily appreciated as the same becomes better understood by reference to the drawing and the following detailed description.

The features of the present invention which are believed to be novel are set forth with particularity in the appended claims.

DESCRIPTION OF THE PREFERRED EMBODIMENT

Figure 1:
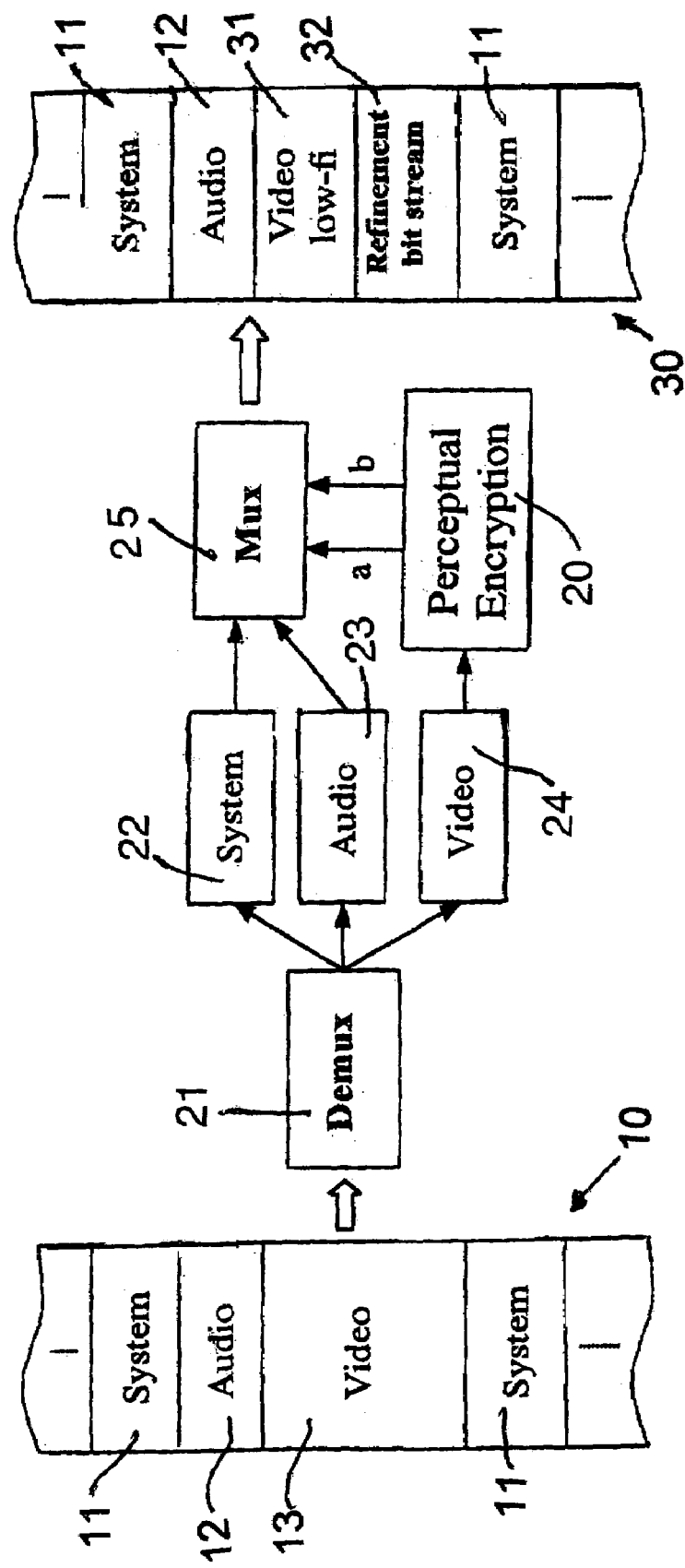
FIG. 1 is a schematic drawing of the architecture of an MPEG-1 program undergoing perceptual encryption to generate a perceptually encrypted MPEG-1 stream according to the present invention.
Figure 2:
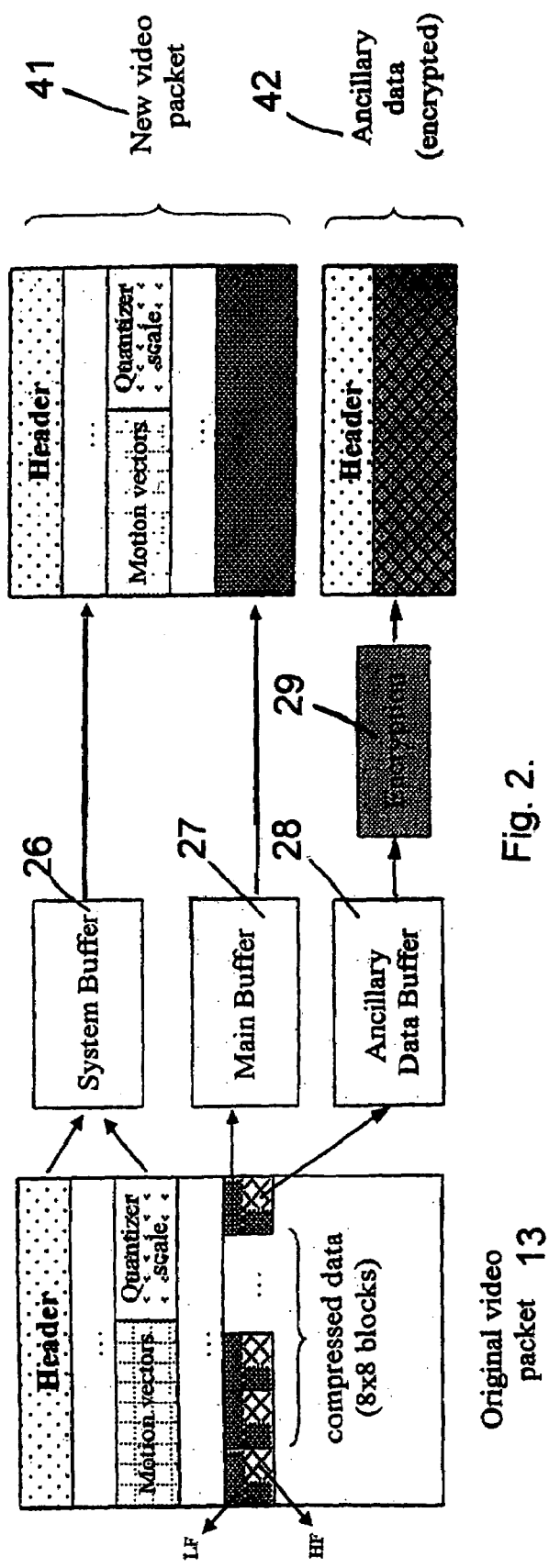
FIG. 2 is a schematic drawing of a diagram showing an original video packet containing high fidelity video being transformed into a new video packet containing low-fidelity video data and an ancillary data containing encrypted refinement data of FIG. 1 using an encrypton module and a key.

Referring to FIG. 1 in conjunction with FIG. 2 an MPEG-1 program 10 includes multiplexed system packets 11, audio packets 12 and video packets. The MPEG-1 program 10 is encoded. The perceptual encryption system 20 includes a de-multiplexing module 21, a system data buffer 22, an audio data buffer 23, a video data buffer 24 and a multiplexing module 25. The system data buffer 22, the audio data buffer 23 and the video data buffer 24 are coupled to the de-multiplexing module 21. The multiplexing module 25 is coupled to the system data buffer 22 and the audio data buffer 23. The perceptual encryption system 20 also includes a system data buffer 26, a main buffer 27, an ancillary data buffer 28 and an encryption module 29 with a key. The encryption module 29 is coupled to the ancillary data buffer 28. U.S. Pat. No. 6,038,316 teaches an encryption module. The encryption module with a key enables encryption of digital information. The encryption module includes logic for encrypting the digital information and distributing the digital information. U.S. Pat. No. 6,052,780 teaches a digital lock which is encrypted it with some n-bit key. In the case of a DES device the block size is 64 bits and the key size is 56 bits. U.S. Pat. No. 4,731,843 teaches a DES device in a cipher feedback mode of k bits. The output of the multiplexing module 25 is a perceptually encrypted MPEG-1 Program 30. The perceptually encrypted an MPEG-1 program 30 includes multiplexed system packets 11, audio packets 12 and low fidelity video packets 31 and refinement bit stream 32.

The overall architecture for perceptual encryption includes a stream of the MPEG-1 program 10. The MPEG-1 program 10 is de-multiplexed, separating the system packets 11, the audio packets 12 and the audio packets 13. The system packets 11 and the audio packets 12 are buffered in the system data buffer 22 and the audio data buffer 23, respectively, and transferred to the multiplexing module 25.

Referring to FIG. 1 the encoding strategy consists in separating the spectral contained in the video sequence across a first video sub-packet 41 and a second video sub-packet 42. The second video sub-packet 42 containing the refinement (high frequency) data is encrypted. To a decoder the non-encrypted first video sub-packet 41 will appear as the original video packet 13. The encrypted second video sub-packet 42 is inserted in the stream as padding data. This operation can be performed both in the luminance as well as in the chrominance domain in order to generate a variety of encoded sequences with different properties. It is possible to build a video sequence where the basic low-fidelity mode gives access to a low-resolution version of the video sequence. The user is granted access to the full-resolution version when he purchases the key. Perceptual encryption is applicable to most video encoding standards, since most of them are based on separation of the color components (RGB or YCbCr) and use spectral information to achieve high compression rates.

Perceptual encryption allows simultaneous content protection and preview capabilities. It is safer than watermarking since it prevents intellectual property rights infringement rather than trying to detect it after the fact. Perceptual encryption is applied to video encoded under the MPEG-1 compression standard. The use of perceptual encryption is not limited to this specific standard. It is applicable to a large ensemble of audio/video compression standards, including MPEG-2, MPEG-4, MPEG-21, MPEG-7, QuickTime, Real Time, AVI, Cine Pak and others.

Figure 3:
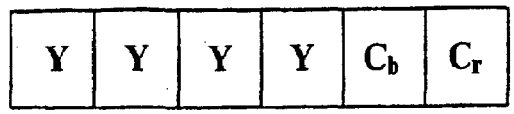
FIG. 3 is a schematic drawing of a diagram showing sequences of luminance and chrominance blocks in the 4:2:0 video format which are used in MPEG-1.

Referring to FIG. 3 an 8×8 pixel image area represents the basic encoded unit in the MPEG-1 standard. Each pixel is described by a luminance term (Y) and two chrominance terms (Cb and Cr). The only video format which the MPEG-1 standard supports is the 4:2:0 format. The chrominance resolution is half the luminance resolution both horizontally and vertically. As a consequence compressed data always presents a sequence of four luminance blocks which are followed by two chrominance blocks.

Figure 4:
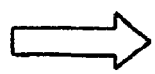
FIG. 4 is a schematic drawing of flow chart of the DCT of the 8×8 block coefficients of the original video packet of FIG. 2.
Figure 4:

Referring to FIG. 4 a flow chart of the transformation from an 8×8 region to 8×8 DCT of each component is computed thereby returning 64 coefficients per component. The coefficients of each component are sorted in order of increasing spatial frequency.

Figure 5:
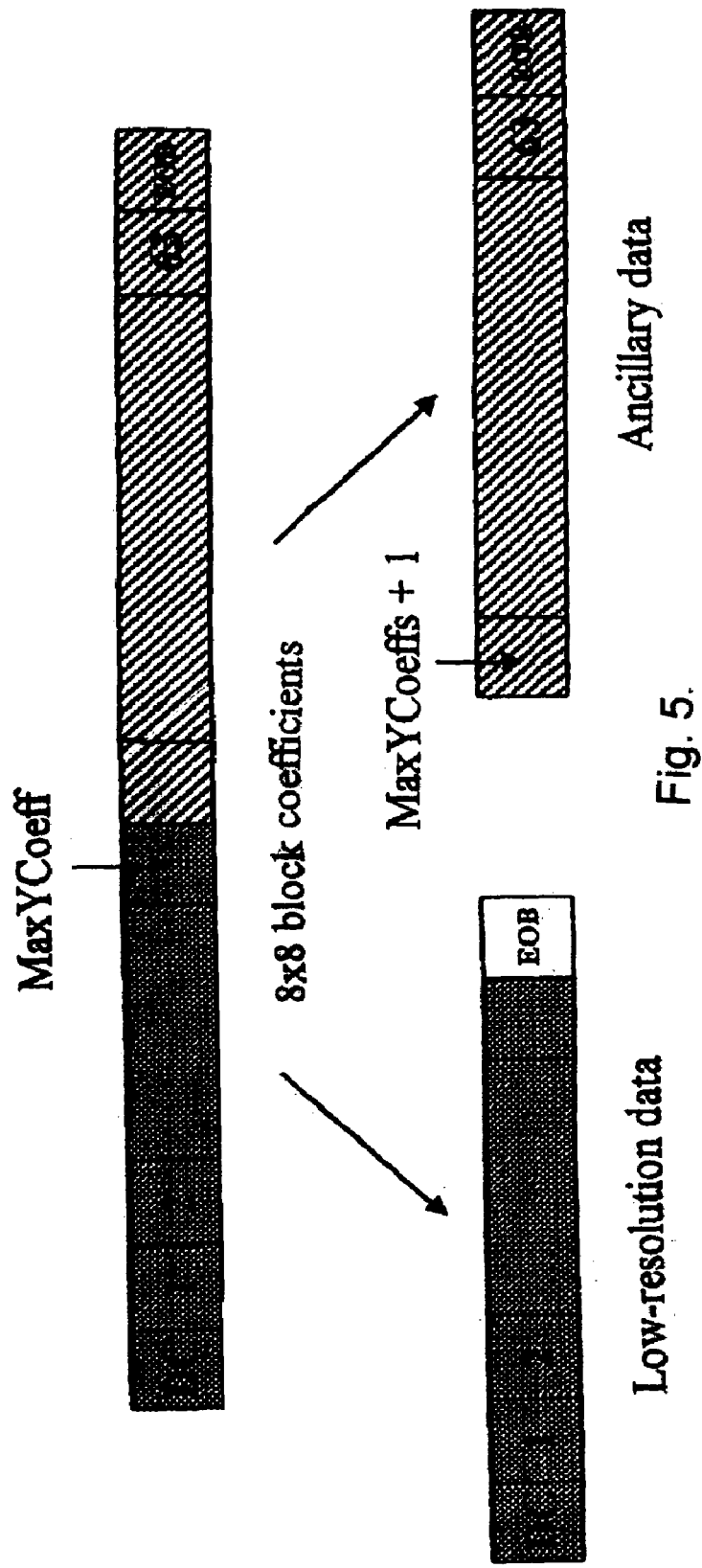
FIG. 5 is a schematic diagram of the 8×8 block coefficients of the original video packet of FIG. 2 which is divided into the low-fidelity video data and the ancillary data.
Figure 6:
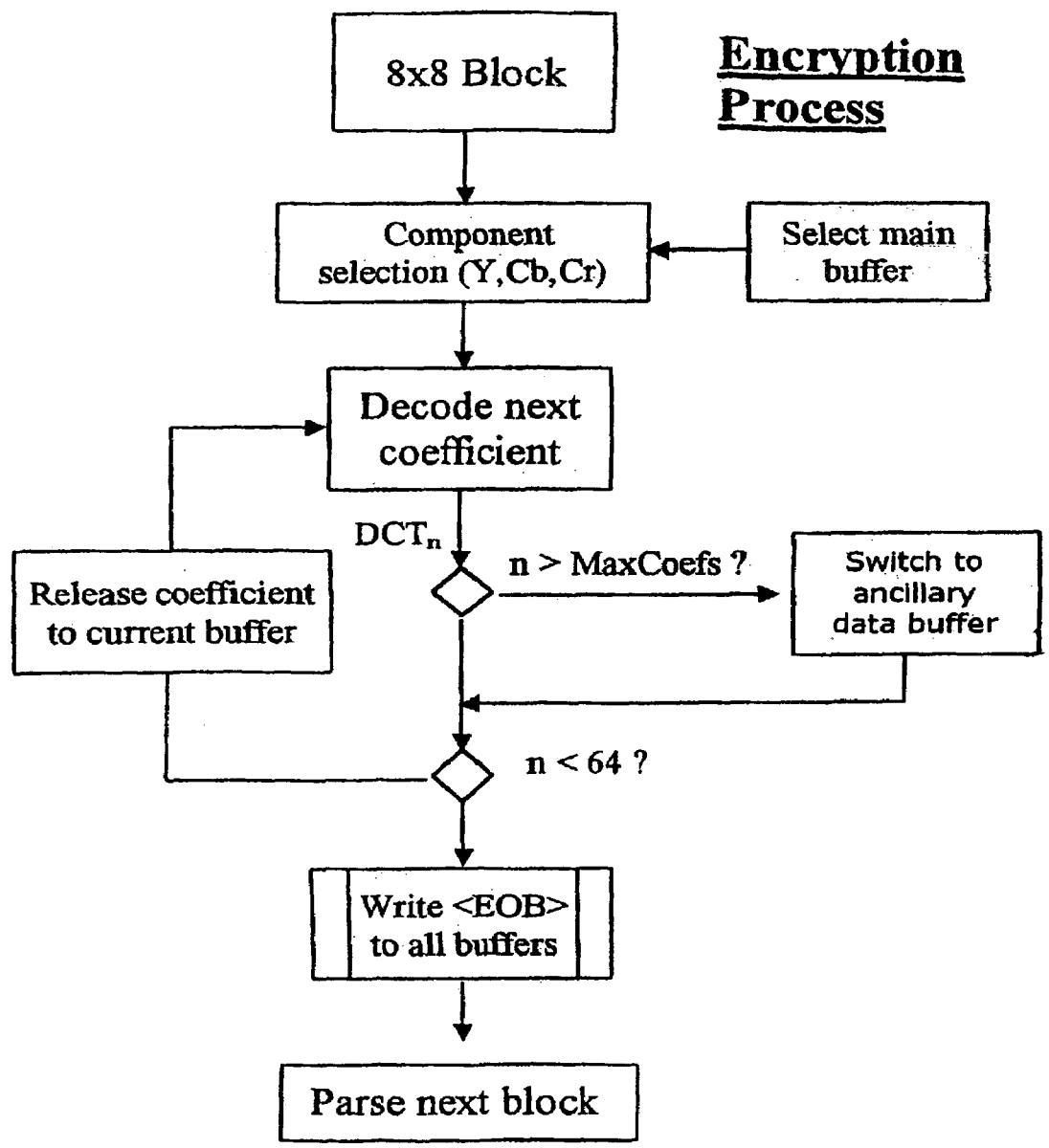
FIG. 6 is a block diagram of perceptual encryption.

Referring to FIG. 5 in conjunction with FIG. 6 as the input bit stream is being parsed, a video packet 13 is identified and its 8×8 DCT coefficients are selectively sent to either a main buffer 27 or an ancillary buffer 28 in order to generate the low-resolution data for the main video packet 31 or the ancillary data for the refinement bit stream 32, respectively. The parameters MaxYCoeffs, MaxCbCoeffs and MaxCrCoeffs allow the content provider to select the maximum number of Y, Cb and Cr coefficients, respectively, to be retained in the original bit stream. As soon as the maximum number of coefficients in the main video packet 31 for a given component is reached, an end-of-block (EOB) code is appended to signal the end of the current block. This is a crucial step since the Huffman encoded 8×8 blocks do not present any start-of-block marker and the EOB sequence is the only element signaling the termination of the compressed block and the beginning of the next. There are two different types of 8×8 data blocks encountered in the MPEG-1 standard. The first type occurs in I-pictures, which consist of frames where no motion prediction occurs. In these frames each 8×8 image region is compressed using a modified JPEG algorithm and the DCT of each of the components is encoded directly (intra-frame compression). In P-pictures and B-pictures, instead, one-directional or bi-directional motion-compensated prediction takes place to exploit the temporal redundancy of the video sequence. In these frames either some or all of the 8×8 image blocks are estimated from the neighboring frames and the prediction error is encoded using a JPEG style algorithm (inter-frame compression). Several strategies for applying different low-pass filters to intra-coded or inter-coded blocks were explored. The optimal solution applies identical low-pass filtering to both types of encoded blocks. The theoretical explanation of this result resides in the superposition-principle. It is a consequence of the fact that the DCT is a linear operator.

Referring to FIG. 6 in conjunction with FIG. 2 once the video packet 13 parsing is complete, the first video sub-packet 31 which is stored in the main buffer 27 is released to the output stream to replace the original video packet 13. The refinement video sub-packet 32 is encrypted and the stored in the ancillary data buffer 28 to be released to the output as a padding stream. The function of the padding stream is normally that of preserving the current bit rate. Since the size of the combined first and second video sub-packets 31 and 32 is only slightly larger than the original video packet 13 the bit rate of the original sequence is preserved and the decoding of the encrypted sequence does not require additional buffering capabilities. A heading-generator generates a specific padding packet header. The padding heading is used to insert the encrypted ancillary data 32 into the video stream. This allows full compatibility with a standard decoder since this type of packet is simply ignored by the decoder. A proprietary 32-bit sequence is inserted at the beginning of the ancillary data to allow the correct identification of the encrypted video sub-packets 32. Moreover since no limit on the size of the video packets 13 is imposed with the exception of buffering constraints additional data, such as decryption information, can be included at any point inside these packets.

In another embodiment perceptual encryption decomposes each of the video packet 13 into several sub-packet. The first sub-packet provides the essential conformance to the standard and contains enough information to guarantee a basic low-fidelity viewing capability of the video sequence. The first video sub-packet is not subject to encryption. Each of the second video sub-packet and all subsequent video sub-packets represents a refinement bit stream and, when added incrementally, serially enhances the "quality" of the basic video packet until a high fidelity video sequence is obtained. Each video sub-packet is encrypted and are placed back in the bit stream as padding streams. The standard MPEG-1 decoder will ignores padding streams.

The definition of "successive levels of quality" is arbitrary and is not limited to a particular one. Possible definitions of level of fidelity are associated with, but are not restricted to, higher resolution, higher dynamic range, better color definition, lower signal-to-noise ratio or better error resiliency. The video packets 13 are partially decoded and successively encrypted.

The main idea behind the perceptual encryption is to decompose each video packet 13 into at least two video sub-packets. The first video sub-packet 31 is the basic video packet and provides the basic compliance with the standard and contains enough information to guarantee low-fidelity viewing capabilities of the video sequence. The first video sub-packet 31 is not subjected to encryption and appears to the decoder as a standard video packet. The second video sub-packet 32 represents a refinement bit stream and is encrypted. The refinement bit stream enhances the "quality" of the basic video packet and when combined with the first video sub-packet 31 is able to restore a full fidelity video sequence. The second video sub-packet 32 is encrypted using the encryption module 29 and the key. Perceptual encryption includes the use of standard cryptographic techniques. The encrypted second video packet 32 is inserted in the bit stream as padding data and is ignored by the standard MPEG-1 decoder.

Perceptual encryption encrypts high quality compressed video sequences for intellectual property rights protection purposes. The key part of perceptual encryption resides in its capability of preserving the compatibility of the encrypted bit stream with the compression standard. This allows the distribution of encrypted video sequences with several available levels of video and audio quality coexisting in the same bit stream. Perceptual encryption permits the content provider to selectively grant the user access to a specific fidelity level without requiring the transmission of additional compressed data. The real-time encryption for compressed video sequences preserves the compatibility of the encrypted sequences with the original standard used to encode the video and audio data. The main advantage of perceptual encryption is that several levels of video quality can be combined in a single bit stream thereby allowing selective restriction access to the users. When compared to other encryption strategies perceptual encryption presents the advantage of giving the user access to a "low fidelity" version of the audio-video sequence, instead of completely precluding the user from viewing the sequence.

Since perceptual encryption acts on the video packets 13, as they are made available, encryption can be performed in real-time on a streaming video sequence with no delay. This result is from the fact that each video packet 13 is perceptually encrypted separately and the refinement bit streams for a specific video packet are streamed immediately following the non-encrypted low fidelity data. This feature is very attractive because it makes it suitable for real-time on demand streaming of encrypted video. Moreover keeping perceptual encryption distributed gives the encoded sequences better error resiliency properties, allowing easier error correction. In order to keep the overhead introduced by perceptual encryption as small as possible, no extra information related to the refinement sub-packets is added to the video packet header.

Figure 7:
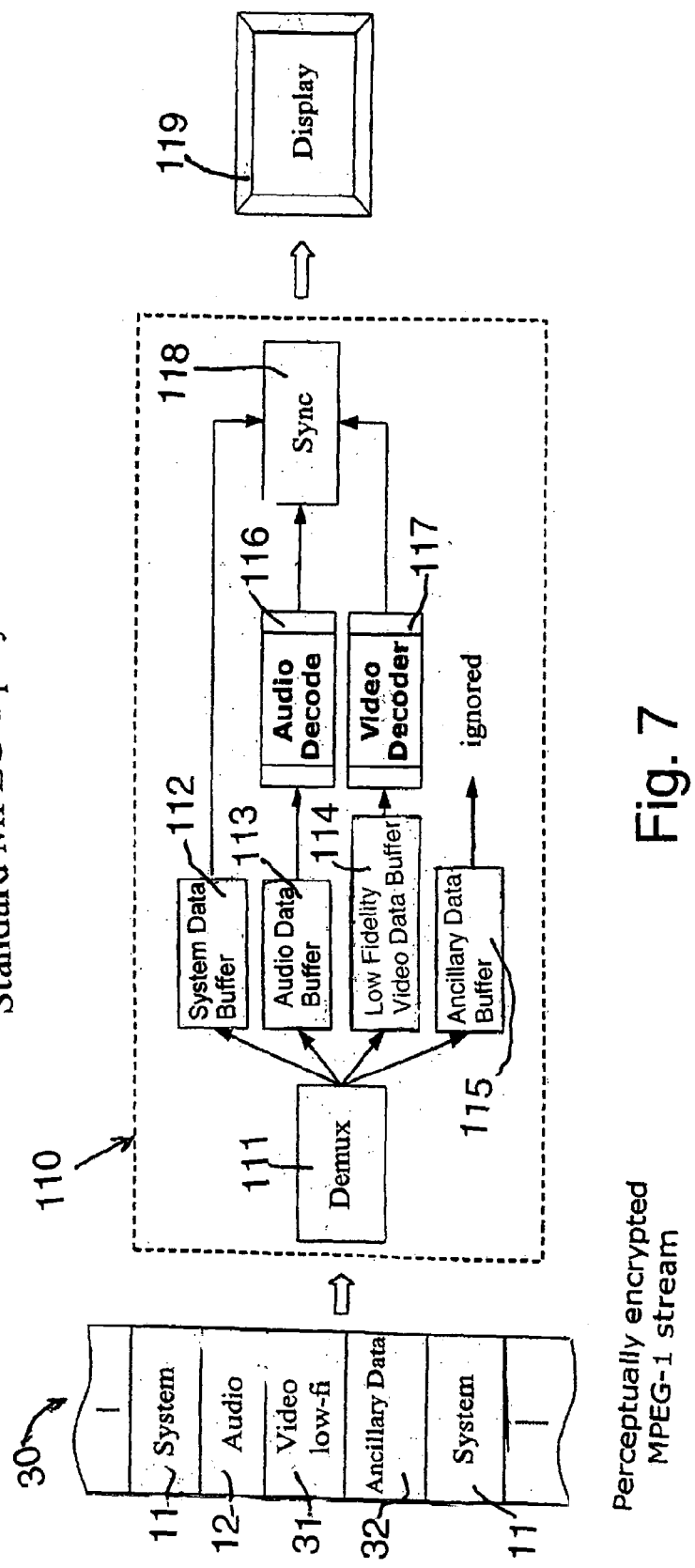
FIG. 7 is a schematic drawing of a standard MPEG-1 player which plays the perceptually encrypted MPEG-1 stream of FIG. 1 as low fidelity video.

Referring to FIG. 7 a standard MPEG-1 player 110 includes a de-multiplexing module 111, a system data buffer 112, an audio data buffer 113, a low fidelity video data buffer 114, a refinement bit stream data buffer 115, an audio decoder 116, a video decoder 117, a synchronizer 118, and a display 119. The system data buffer 112, the audio data buffer 113, the low fidelity video data buffer 114 and the refinement bit stream data buffer 115 are coupled to the de-multiplexing module 111. The synchronizer 118 is coupled to the system data buffer 112 and the audio data buffer 113. The video decoder 117 is coupled to the low fidelity video data buffer 114. The synchronizer 118 is also coupled to the video decoder 117. The video decoder 117 may include a Huffman decoder and an inverse DCT, motion compensation and rendering module. The display 119 is coupled to the inverse DCT, motion compensation and rendering module. The standard MPEG-1 player 110 performs the input stream parsing and de-multiplexing along with all of the rest of operations necessary to decode the low fidelity video packets including the DCT coefficient inversion, the image rendering as well as all the other non-video related operations.

Figure 8:
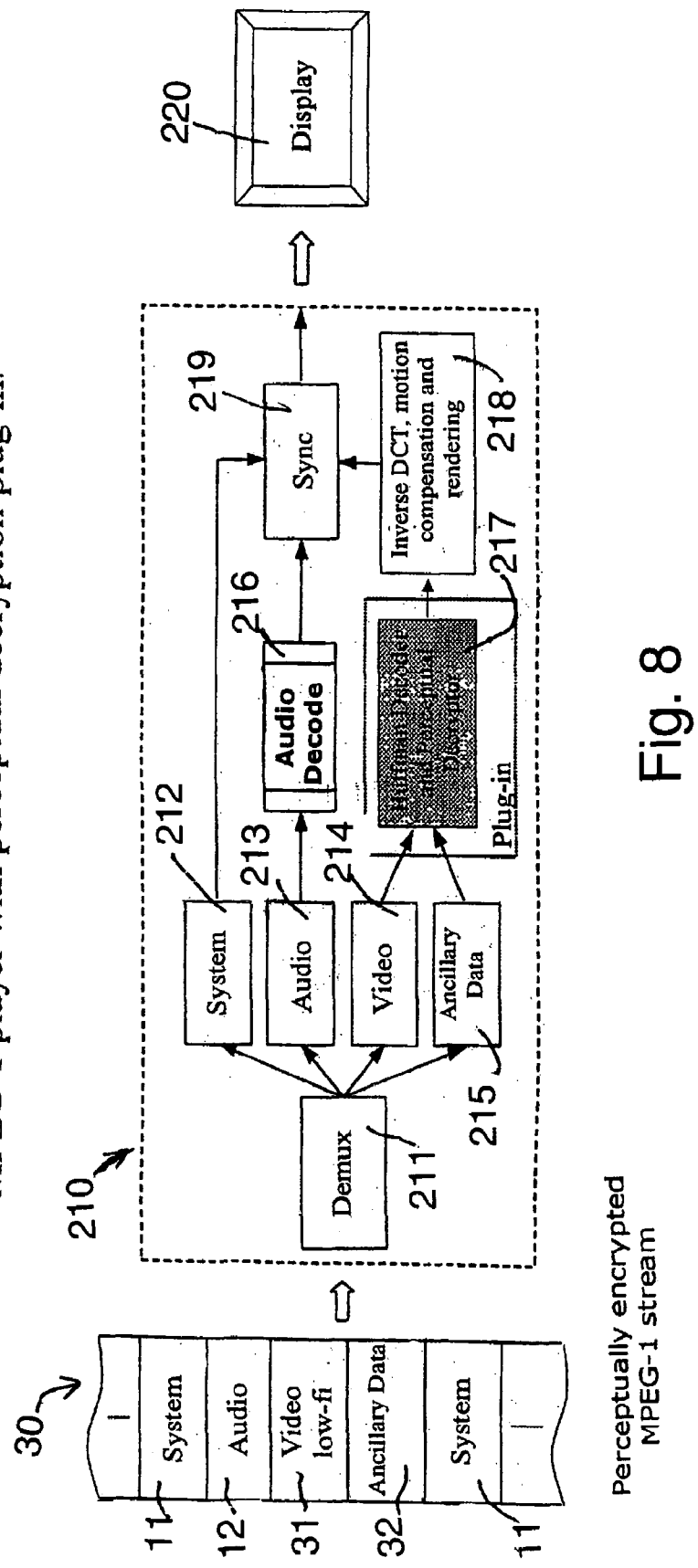
FIG. 8 is a schematic drawing of a standard MPEG-1 player which has a decryption module which with the use of the key of FIG. 1 plays the perceptually encrypted MPEG-1 stream of FIG. 1 as high fidelity video according to the present invention.
Figure 9:
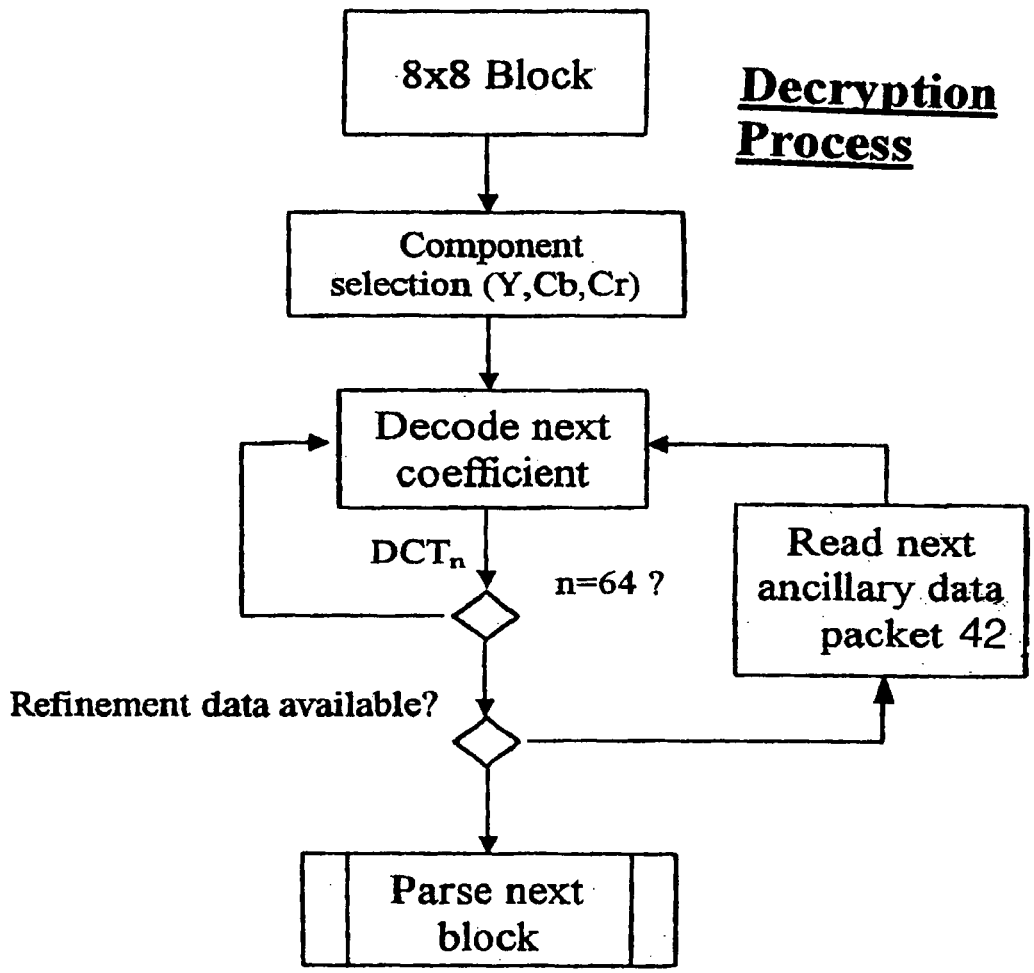
FIG. 9 is a block diagram of perceptual decryption.

Referring to FIG. 8 in conjunction with FIG. 9 an MPEG-1 player 210 includes a de-multiplexing module 211, a system data buffer 212, an audio data buffer 213, a low fidelity video data buffer 214, a refinement bit stream data buffer 215, an audio decoder 216, a Huffman Decoder and Perceptual Decryptor Plug-in 217, an inverse DCT, motion compensation and rendering module 218, a synchronizer 219 and a display 220. The system data buffer 212, the audio data buffer 213, the low fidelity video data buffer 214 and the refinement bit stream data buffer 215 are coupled to the de-multiplexing module 211. The audio decoder 216 is coupled to the audio data buffer 213. The synchronizer 219 is coupled to the system data buffer 212 and the audio decoder 216. The Huffman decoder and perceptual encryptor Plug-I 217 is coupled to the low fidelity video data buffer 214 and the refinement bit stream data buffer 215. The inverse DCT, motion compensation and rendering module 218 is coupled to the Huffman Decoder and Perceptual Decryptor Plug-in 217. The synchronizer 218 is also coupled to the inverse DCT, motion compensation and rendering module 218. The display 220 is coupled to the synchronizer 218. The Huffman decoder and Perceptual Encryptor plug-in 217 performs the input stream parsing and de-multiplexing for the MPEG-1 player 210. The MPEG-1 player 210 performs all of the rest of operations necessary to decode the low fidelity video packets including the DCT coefficient inversion, the image rendering, as well as all the other non-video related operations. The plug-in may be designed to handle seamlessly MPEG-1 sequences coming from locally accessible files as well as from streaming video. U.S. Pat. No. 6,038,316 teaches a decryption module. The decryption module enables the encrypted digital information to be decrypted with the key. The decryption module includes logic for decrypting the encrypted digital information. The standard MPEG-1 player 210 is coupled to a display 214. The plug-in replaces the front-end of the MPEG-1 player and performs the input stream parsing and de-multiplexing. The plug-in carries on all the operations necessary to decode the video packets 31 and 32 and perform decryption. Similarly to perceptual encryption decryption acts on one video packet at the time. Once the current video packet is buffered the system searches for its refinement sub-packets that immediately follow the main packet. According to the level of access to the video sequence granted to the user, the available refinement bit streams are decrypted and are combined with the original packet. The fusion of the main packet 31 with the refinement sub-packets 32 takes place at the block level. In decryption only additional spectral information is contained in the refinement data. This implementation represents a possible example of definition of multiple level of access to the video sequence, but decryption is not limited to a particular one.

The encrypted bit streams contain refinement DCT coefficients whose function is to give access to a full-resolution high fidelity version of the video sequence. The fusion of the original block data with the refinement coefficients is possible with minimal overhead using the following process. Given an 8×8 image block, the Huffman codes of the main packet are decoded until an end-of-block sequence is reached. At this point the decrypting module 211 starts decoding the Huffman codes of the next refinement packet, if any is available. The DCT coefficients are then appended to the original sequence until the EOB sequence is read. Decryption continues until all the refinement packets are examined. In the special case of an additional sub-packet that does not contain any additional coefficient for the given 8×8 block, an EOB code is encountered immediately at the beginning of the block, signaling the Huffman Decoder and Perceptual Decryptor Plug-in 217 that no further DCT coefficients are available.

In the implementation of decryption for the MPEG-1 standard player, the encrypted bit streams contain refinement DCT coefficients whose function is to give access to a full-resolution high fidelity version of the video sequence. The fusion of the original block data with the refinement coefficients is possible with minimal overhead using the following process. Given an 8×8 image block, the Huffman codes of the main packet are decoded until an end-of-block sequence is reached. At this point the decrypting module starts decoding the Huffman codes of the next refinement packet, if any is available. The DCT coefficients are then appended to the original sequence until the EOB sequence is read. Decryption continues until all the refinement packets are examined. In the special case of an additional sub-packet that does not contain any additional coefficient for the given 8×8 block, an EOB code is encountered immediately at the beginning of the block, signaling the Huffman Decoder and Perceptual Decryptor Plug-in 217 that no further DCT coefficients are available.

Similarly to the perceptual encryption the decryption takes place independently on each video packet, allowing real-time operation on streaming video sequences. As soon as all the refinement sub-packets, following the principal packet, are received, decryption can be completed. A technology for encrypting high quality compressed video sequences for rights protection purposes resides in its capability of preserving the compatibility of the encrypted bit stream with the compression standard. The technology allows the distribution of encrypted video sequences with several available levels of video and audio quality coexisting in the same bit stream. The technology permits to selectively grant the user access to a specific fidelity level without requiring the transmission of additional compressed data. The technology is a real-time encryption/decryption technique for compressed video sequences. The technology preserves the compatibility of the encrypted sequences with the original standard used to encode the video and audio data. The main advantage of the technology is that several levels of video quality can be combined in a single bit stream allowing selective access restriction to the users. When compared to other common encryption strategies implementation of the technology presents the advantage of giving the user access to a "low fidelity" version of the audio-video sequence, instead of completely precluding the user from viewing the sequence.

The description of the technology has focused on the MPEG-1 standard in order to provide a detailed description of the technology. See ISO/IEC 11172-1:1993 Information Technology-Coding of Moving Pictures and Associated Audio for Digital Storage Media up to about 1.5 Mbit/s-Part 1:Systems, Part 2: Video. The scope of technology is not limited to this specific standard. The technology is applicable to a large ensemble of audio/video compression standards. See V. Bhaskaran and K. Konstantinides. Image and Video Compression Standards: Algorithms and Architectures. Kluwer Academic Publishers, Boston, 1995.

In the MPEG-1 standard a high compression rate is achieved through a combination of motion prediction (temporal redundancy) and Huffman coding of DCT (Discrete Cosine Transform) coefficients computed on 8×8 image areas (spatial redundancy). See J. L. Mitchell, W. B. Pennebaker, C. E. Fogg and D. J. LeGall. MPEG Video Compression Standard. Chapman & Hall. International Thomson Publishing, 1996. One of the most important features of the DCT is that it is particularly efficient in de-coupling the image data. As a consequence the resulting transformed blocks tend to have a covariance matrix that is almost diagonal, with small cross-correlation terms. The most relevant feature to the technology, though, is that each of the transform coefficients contains the information relative to a particular spatial frequency. As a consequence cutting part of the high frequency coefficients acts as a low-pass filter decreasing the image resolution.

From the foregoing it can be seen that perceptual encryption and decryption of movies have been described.

Accordingly it is intended that the foregoing disclosure and drawings shall be considered only as an illustration of the principle of the present invention.

What is claimed is:

1. A combined encoder and perceptual encrypter for a high quality video, said combined encoder and perceptual encrypter comprising:
   a. an encoder which encodes the high quality video as a data file in an MPEG format; and
   b. an encryption module which perceptually encrypts a first part of said data file and leaves a remaining portion as an unencrypted second part of said data file as thereby generating a restricted quality video.

2. A combined perceptual decrypter and decoder for use with said combined encoder and perceptual encrypter according to claim 1, said combined perceptual decrypter and decoder comprising:
   a. a decryption module which decrypts said encrypted first part of said data file and combines said decrypted first part of said data file with said unencrypted second part of said data file thereby regenerating said data file; and
   b. a decoder coupled to said perceptual decryption module wherein said decoder decodes said data file thereby regenerating the high quality video.

3. A combined encoder and perceptual encrypter for a high quality video, said combined encoder and perceptual encrypter comprising:
   a. an encoder which encodes the high quality video as a data file; and
   b. an encryption module which perceptually encrypts a first part of said data file and leaves a remaining portion as an unencrypted second part of said data file as thereby generating a restricted quality video.

4. A combined perceptual decrypter and decoder for use with said combined encoder and perceptual encrypter according to claim 3, said combined perceptual decrypter and decoder comprising:
   a. a decryption module which decrypts said encrypted first part of said data file and combines said decrypted first part of said data file with said unencrypted second part of said data file thereby regenerating said data file; and
   b. a decoder coupled to said perceptual decryption module wherein said decoder decodes said data file thereby regenerating the high quality video.

* * * * *